(No Model.) 5 Sheets—Sheet 3.

W. H. BOYLE & T. S. HOMANS.
MORTISING MACHINE.

No. 581,534. Patented Apr. 27, 1897.

Witnesses
Lawrence W. Churchill
George W. Redfield

Inventors
William H. Boyle
Thomas S. Homans (No Model.) 5 Sheets—Sheet 4.
W. H. BOYLE & T. S. HOMANS.
MORTISING MACHINE.
No. 581,534. Patented Apr. 27, 1897.
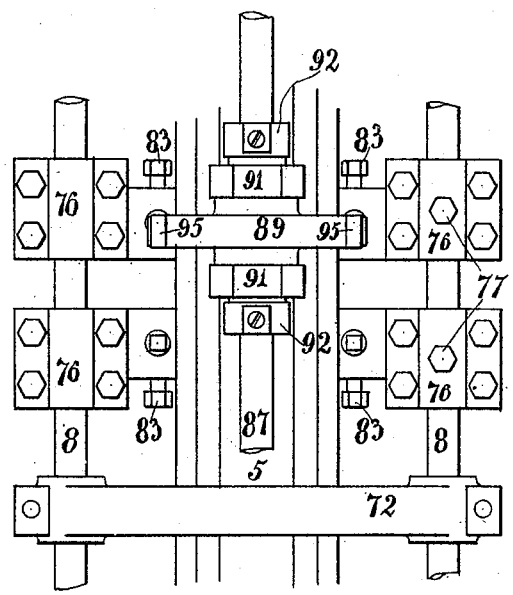
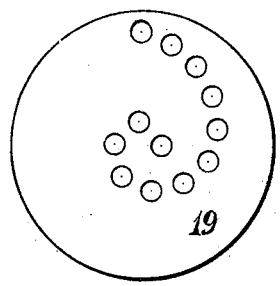
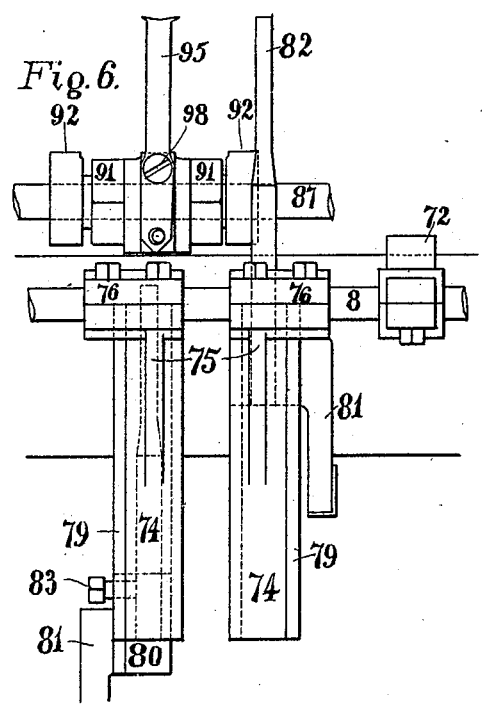
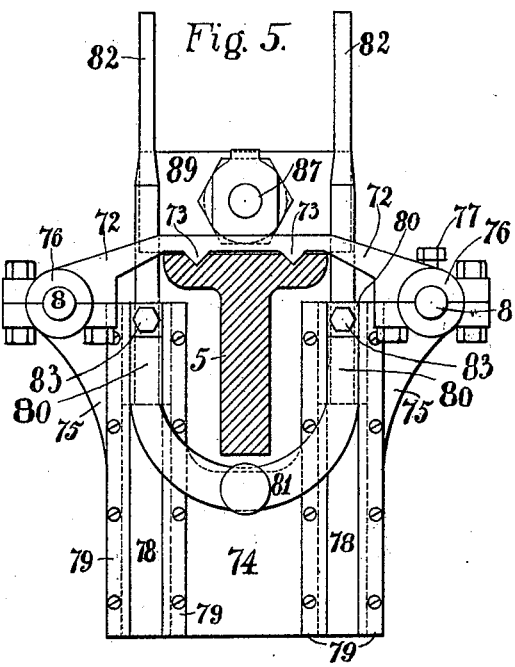
Witnesses
Lawrence W. Churchill
George W. Redfield
Inventors
William H. Boyle
Thomas S. Homans (No Model.)  5 Sheets—Sheet 5.

W. H. BOYLE & T. S. HOMANS.
MORTISING MACHINE.

No. 581,534.  Patented Apr. 27, 1897.

Witnesses
Lawrence W. Churchill
George W. Redfield

Inventors
William H. Boyle
Thomas S. Homans

UNITED STATES PATENT OFFICE.

WILLIAM H. BOYLE AND THOMAS S. HOMANS, OF OSWEGO, NEW YORK.

MORTISING-MACHINE.

SPECIFICATION forming part of Letters Patent No. 581,534, dated April 27, 1897.

Application filed April 9, 1896. Serial No. 586,791. (No model.)

*To all whom it may concern:*

Be it known that we, WILLIAM H. BOYLE and THOMAS S. HOMANS, citizens of the United States, residing at Oswego, in the county of Oswego and State of New York, have invented certain new and useful Improvements in Mortising-Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to machines for mortising door-stiles, and particularly to that class of mortising-machines by which more than one stile may be operated upon during the same interval of time.

Our invention has for its object the improvement of machines of the character stated, and each constituent element of our invention is described in detail and its office, together with the mode of operation of the whole, fully explained hereinafter.

Figure 1:
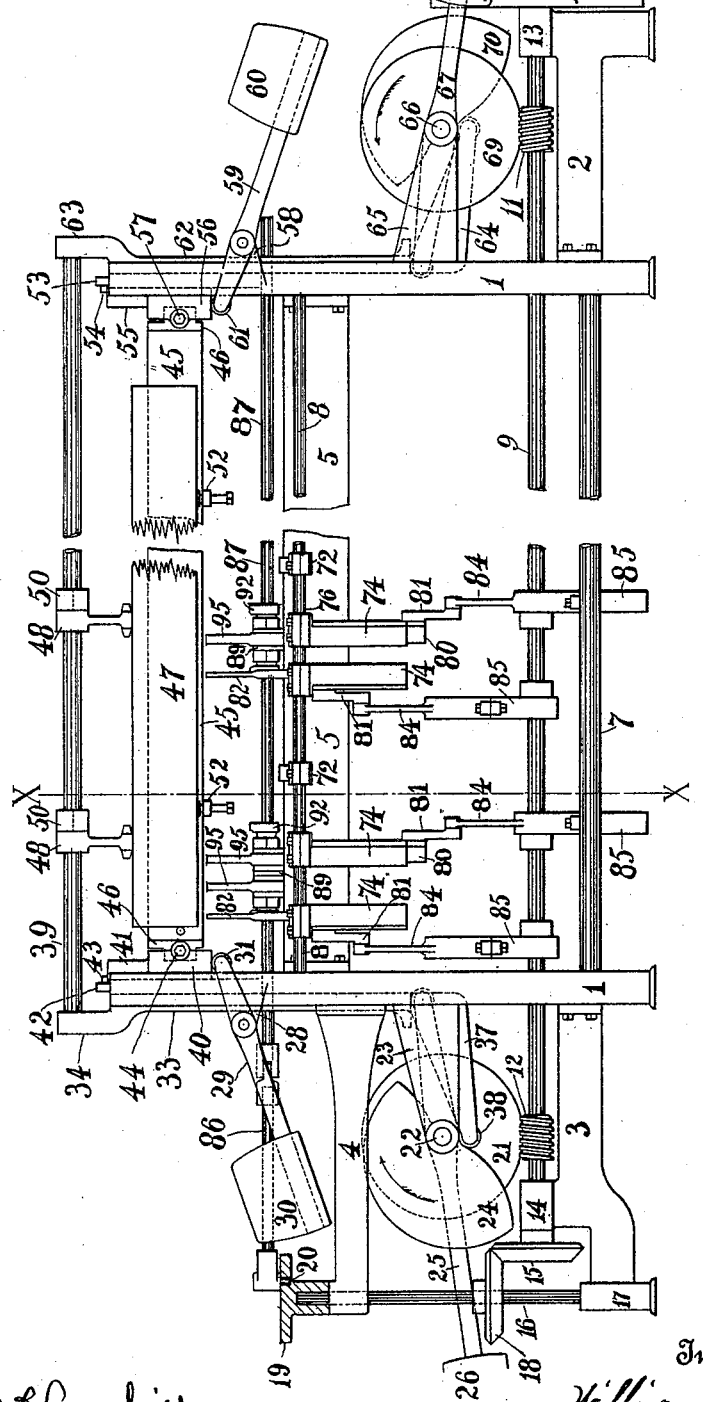
Figure 2:
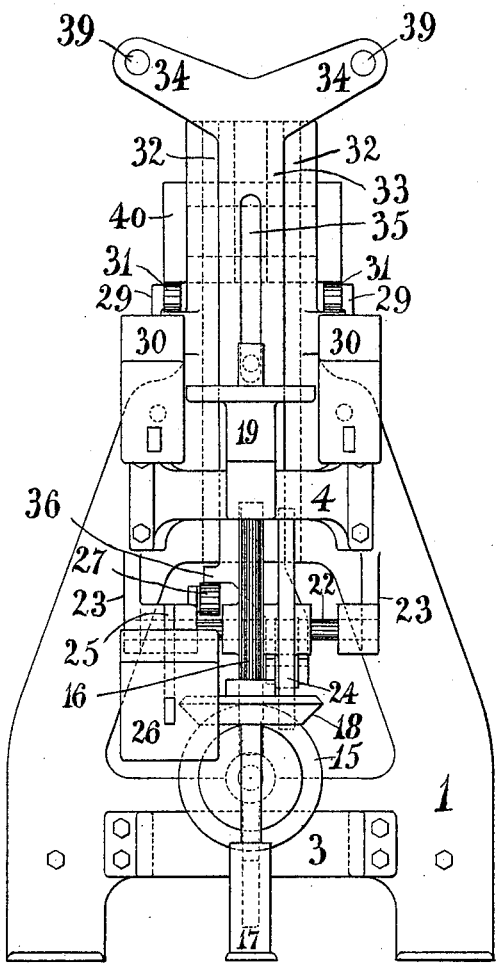
Figure 3:
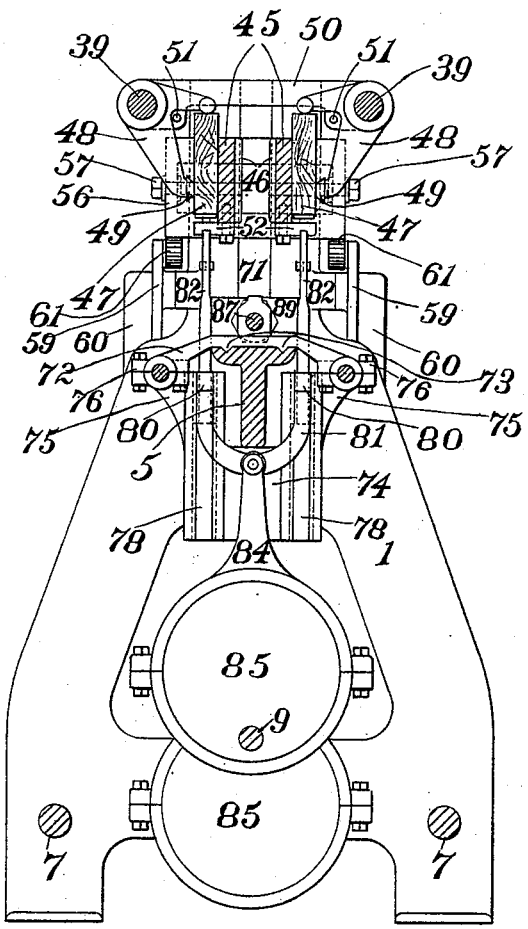
Figure 10:
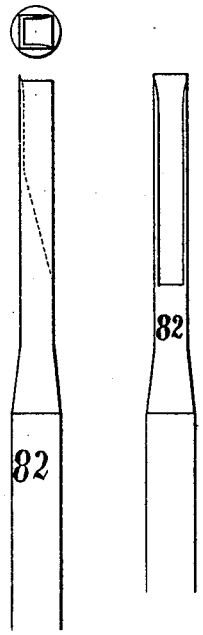
Figure 8:
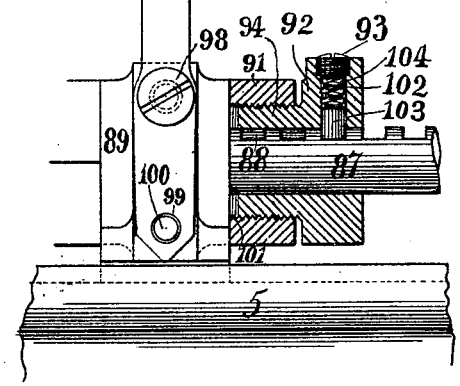
Figure 9:
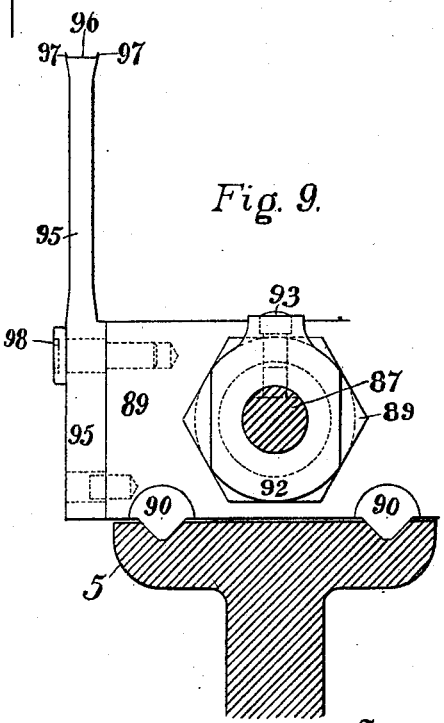

Referring to the accompanying drawings, wherein like figures are used to designate like parts throughout the several views, Figure 1 represents a side view of our invention, showing all the parts assembled. Fig. 2 represents an end view, slightly enlarged, taken from a point outside and to the left of the machine. Fig. 3 represents a partly sectional view taken from a point between the end frames upon a line X X, rising midway of the width of the machine, as indicated in the first figure, looking toward the right. Fig. 4 represents a top plan view, detached and enlarged, showing portions of the rods employed to support the guide-plates wherein the sockets for the vertically-acting chisels reciprocate. A top plan of one of the braces connecting the rods is also shown in this view. Fig. 5 represents a front view, enlarged, of one of the guide-plates as shown in the third figure, the means of attaching the plates upon the supporting-rods being also presented. Fig. 6 represents a side view, enlarged, of guide-plates, braces, stay-beam, vertically-acting and horizontally-acting chisels, showing the relative positions of the chisels at terminal points of the strokes of each. Fig. 7 represents a top plan of the crank-plate, enlarged. Fig. 8 represents a side view, enlarged and partly in section, of a portion of the reciprocative rod, the block carrying the horizontally-acting chisel, the means of adjusting and fixing the block upon the rod, the means of pivotally attaching the chisel to the block, and the manner of limiting the play of the chisel. Fig. 9 represents an end view of the block carrying the horizontally-acting chisel, showing the manner in which the block is supported and guided by the stay-beam, the latter appearing in section; and Fig. 10 represents an enlarged view of the details of the vertically-acting chisels.

Considering Figs. 1, 2, and 3, numeral 1 designates the end frames, designed to rest upon the floor and support the working parts. They are pierced by suitable orifices and provided upon both sides of their upper portions with channels constructed as guides for sliding elements to be hereinafter described.

Numerals 2, 3, and 4 designate additions and attachments to the frames 1 and will be again noticed.

5 designates the stay-beam. It is T-shaped and grooved longitudinally upon its upper surface for the guidance of the movable parts, which it also partly supports. Beam 5 possesses lateral flanges at both ends, and through them bolts pass, by means of which the beam and frames 1 1 are securely joined.

6 6 mark the grooves in the upper surface of the beam.

Near their feet the frames 1 1 are further held together by rods 7 7, bolted to the frames, as shown in Fig. 2.

8 8 designate other rods extending longitudinally from frame 1 upon the right to frame 1 upon the left, and these rods may also be regarded as stays for the end frames, although their principal office is to support the chisel-operating mechanisms described hereinafter.

9 designates a revoluble shaft having a driving-pulley 10, fixed upon one end. (Shown in the first figure at the right.) Shaft 9 carries worms 11 and 12 near opposite ends. It is suitably journaled in bearings 13 and 14, borne by extensions 2 and 3 of the frame, and is provided with a miter gear-wheel 15 at its extremity upon the left, as shown in Fig. 1.

16 designates an upright revoluble shaft supported in a bearing 17, forming part of extension 3 of the frame. A miter-wheel 18 is fixed upon this shaft and arranged to mesh with wheel 15. Near the top shaft 16 passes through a bearing in the attachment 4 of the frame, and a crank-plate 19 heads the shaft. The crank-plate is provided with a number of orifices at various distances from the center, (see Fig. 7,) which are designed to receive a crank-pin 20 for a purpose to be later explained.

Upon the left of Fig. 1 number 21 designates a worm-wheel fixed upon a cross-shaft 22. The shaft is journaled in attachments 23 23, projecting from frame 1. A cam 24 is also fixed upon shaft 22, and a lever 25 is fulcrumed upon that shaft.

26 marks a weight removably placed upon the lever, and 27 designates a roller borne upon the opposite end of the lever.

Above the frame attachment 4 brackets 28 28 project and afford a fulcrum for lever 29, which is provided at opposite extremities with weight 30 and roller 31.

Exteriorly the left frame 1 has a channeled portion 32, in which is movably fitted a slide 33. The channel or guide and the slide may be of a dovetail form or constructed in any convenient manner. At the topmost portion of slide 33 are upwardly and outwardly extended arms 34, and through its body portion the slide is provided with a longitudinal slot 35. The central vertical slot through slide 33 is represented only in Fig. 2. As the two duplicate slides at opposite ends of the machine are precisely alike in every feature, it has not been regarded as essential that each slide should be shown twice completely.

36 marks a lug projecting from slide 33 near its lower end and is intended to rest in contact with roller 27, as shown in Fig. 2. At one side of the lower portion of slide 33, usually upon the side opposite and below the lug, there is attached an arm 37, having at its outer end a roller 38, intended to bear against cam 24, as shown in Fig. 1.

39 39 mark the rods joining the arms 34 34 of slide 33 with similar arms of an identical slide at the opposite end of the machine. (See Fig. 1.)

Number 40 designates a rectangular frame which is formed integral with or attached to a block 41, adapted to be reciprocated vertically within a guiding-channel cut within the inner surface of the frame 1. Upon the top of the end frame 1 there is fixed a block or projection 42, which possesses a finger or pin 43, so held as to limit the upward movement of sliding block 41 and necessarily the parts attached to and affected by the movement of the block.

44 designates certain screws arranged to rotate in smooth orifices in the ends of frame 40 and prevented from advancing or retreating from their established positions by inner and outer collars, as shown in Fig. 3. The threads of screws 44 are located near their inner ends and are constructed to engage correspondingly-threaded orifices in plates 46. Fixed to the ends of the beams 45 or extending along for a greater or less distance are the plates 46, one portion of each plate being formed into a block designed to fit the rectangular frame 40 interiorly and to be moved back and forth therein. Within the limits, therefore, as indicated in Fig. 3, the interval between the blocks or plates 46, and consequently between beams 45, may be increased or decreased at pleasure.

47 47 mark two door-stiles clamped in position to be operated upon, and 48 designates each of the bell-crank lever-clamps pivoted upon and supported by rods 39 39. The lower clamping-point of the clamps 48 are each provided with a rubber, leather, or spring hood 49 to prevent injury to the surface of the stiles.

50 designates each of the tie-braces connecting rods 39 39 to prevent springing under the strain of ordinary usage, and 51 51 mark pins driven into the tie-braces and arranged to project between the arms of the bell-crank clamps for the purpose of limiting the movement of the latter when disengaged.

52 designates each of a number of adjustable stops, which may be fixed at intervals along the lower edges of beams 45 45 and employed to gage and limit the depth of the mortises.

Upon the right of Fig. 1 appear a number of parts which are duplicates of those already mentioned and shown upon the left of that figure. The duplicate parts are numbered 53 54 55 56 57 58 59 60 61 62 63 63 64 65 65 66 67 68 69 70. The original parts are numbered 42 43 41 40 44 28 29 30 31 33 34 34 37 23 22 25 26 21 24, arranged in the same order as the duplicate parts just enumerated. The construction and operation of these elements are exactly alike throughout, and it will be observed, therefore, that while cam 24 appears before worm-wheel 21 upon the left of Fig. 1 the cam 70 appears in rear of worm-wheel 69 upon the right of the figure.

71, Fig. 3, designates the central vertical guide formed in the inner surface of right frame 1. This guide has its counterpart within left frame 1. The inner guides in right and left frames 1 1 are respectively traversed by sliding blocks 41 and 55.

72 marks each of a number of braces connecting rods 8 8. A plan of the braces is shown in Fig. 4 and side views in Figs. 3 and 5. Suitably-formed clamping members are provided at opposite ends of each brace 72, through which are bolt-holes for the reception of bolts. The construction is that ordinarily employed and is believed to be sufficiently explained by the drawings.

73 73 mark depending ridges from the lower surface of each brace 72, formed and capable of being arranged to occupy the grooves 6 6 in the stay-beam 5.

Best shown in Fig. 5 is one of a number of guide-plates 74, having lateral extensions 75, which are provided with suitably-shaped clamping members constructed to be connected by bolts with correspondingly-shaped upper clamping members 76, between which rods 8 8 are intended to be clamped at any point throughout the length of those rods, the position of the plate 74 being further fixed by a set-screw 77, passing through the upper member 76 in the common manner. Guide-grooves 78 are formed at the sides of the plates 74, and retaining-plates 79 are screwed to plate 74 in order to confine within the guide-grooves the sliding sockets 80, connected by a curving cross-head 81, and in which are fixed by ordinary set-screws the vertically-acting chisels 82. The set-screws are numbered 83. Pivotally connected with cross-heads or yokes 81 81 are eccentric-rods 84 84, operated in the usual way by eccentrics 85, which are fixed upon longitudinal shaft 9, already described.

Returning to the left-hand side of Fig. 1 it will be seen that crank-pin 20 projects downwardly from the outer end of a pitman-rod 86, which is pivotally connected with a rod 87, having recesses or notches 88 and supported movably lengthwise within suitable orifices in the two end frames 1 1. A block 89, having depending ridges 90, constructed to engage grooves 6 6 in the stay-beam, (see enlarged Fig. 9,) is also provided with a nut 91, usually hexagonal. A collar 92, fitting the movable rod 87, carries a screw-plug 93 within a suitably-threaded orifice. A cylindrical extension of the collar is numbered 94 and is threaded exteriorly in correspondence with the interior of hexagonal nut 91.

95 marks each horizontally-acting chisel, having a cutting edge 96 in connection with side cutting-blades 97. These chisels are pivoted to opposite sides of blocks 89 by pivot-screws 98 (see Figs. 8 and 9) and are provided with orifices 99 near their lower ends. The orifice 99 is somewhat larger than the pin 100, driven through it into the block 89, and a certain amount of play is thus permitted the cutting end of the chisel.

Number 101 designates the cylindrical threaded extension of block 89, constructed to engage nut 91.

Number 102 marks a spiral spring, and 103 a pin, both contained in orifice 104 of collar 92, and within and near the top of which orifice the screw-plug 93 is engaged. (See Figs. 8 and 9.)

The manner of assembling the parts of our invention will now have been understood, and its operation may be described as follows: Weights 26 and 68, acting through their respective levers, balance the exterior slides, together with the rods 39 39, braces, and clamps. Weights 30 and 60, acting through their levers, overbalance slides 41 55, beams 45, and attachments, together with the door-stiles, and while the parts occupy the positions shown in Fig. 1 the sliding blocks are pressed strongly upward against fingers 43 54. Under these conditions no pressure is exerted upon or by the bell-crank clamps, which are therefore practically disengaged. The proper adjustment of stops 52 and beams 45 having been made, the door-stiles can be easily and quickly placed in position or removed by a comparatively unskilled attendant. Assuming the stiles to be in place (see Fig. 3) and the machine in operation, the movement of the cams lowers the exterior slides 33 62, and the knobs terminating the upper arms of the bell-crank clamps meet the upper edges of the stiles, causing the spring-hoods terminating the lower arms to be pressed strongly against the outer surface of each stile. This downward pressure is transmitted through stops 52 to the beams 45 45, and consequently to levers 29 and 59, raising the weights thereupon. Under these conditions the office of the weights is to force the stiles more strongly within the grasp of the bell-crank clamps and against beams 45.

It will be observed that the cams 24 70 are so fashioned that the parts concerned in clamping and carrying the stiles, when actuated, move in the following-stated cycle: Assuming the start to be made from the positions presented by Fig. 1, first, there is a brief period of rest while the cams revolve in the direction of the arrows. Then the shorter of the two radially-extending curves possessed by each cam meets roller 38 and a like roller upon arm 64, and the exterior slides, rods 39 39, and bell-crank clamps are brought quickly downward, this stage of the movement terminating with the engagement between clamps and stiles. Secondly, the rollers meet curves eccentric to the cam-shafts, and the exterior and inner slides, with the parts attached to both, are moved downwardly together, but more slowly than the motion given the clamping elements alone during the first stage above described. Thirdly, when the limits of the eccentric curves of the cams are reached the longer of the two radially-extending curves of each cam permits the rollers to rise, as the falling weights 30 60 rapidly lift all the parts which had been lowered. The positions from which every element began its tour are thus regained.

The construction of our invention is such that stiles of any thickness or length may be adjusted directly above the chisels.

From the preceding description it will be readily perceived that each eccentric, guide-plate, brace, or horizontally-sliding block relating to the chisels may be fixed at any point upon the driving-shaft, supporting and reciprocative rods, between the upright end frames.

Referring to Fig. 8, it will be seen that spring 102 is confined between the screw-plug and pin 103, which occupies one of the recesses 88. As ordinarily made, the recesses are of rectangular cross-section, their bottoms being parallel with the same plane tangent to the cylindrical surface of rod 87. If therefore nut 91 be unscrewed from extension 101 and the collar 92 be turned by hand, the pin will be forced upward, compressing the spring until the regular surface of the rod 87 is reached, whereupon the collar may be moved along the rod and the pin compelled to engage any recess desired. When the final location of the collar is determined, the block 89 is brought forward against it and the nut caused to resume its engagement with extension 101. An exceedingly fine adjustment is thus available, and each block 89 is provided at both ends with sets of adjusting elements, as described. The length of mortise and its position being determined for a stile of given size, the chisel-operating mechanisms are correspondingly fixed. The eccentrics reciprocate the vertically-acting chisels, and the crank-pin 20 is inserted in that orifice of the crank-plate which will move rod 87 and consequently block 89 back and forth within the established limits set for the particular work to be done.

It will be observed (see Figs. 1 and 6) that each pair of chisels 82 82 is arranged to be withdrawn upon the approach of an adjacent pair of chisels 95 95 and the latter allowed to pass immediately over the former. Three cutting edges are given each vertically-acting chisel, (see Fig. 10,) and in the recess formed between the two parallel sides the chips split off by the chisels 95 are jammed by the upward and withdrawn by the downward movement of chisel 82, which cuts the end of the mortise in the ordinary way. The necessity of allowing a slight movement to the cutting edges of chisels 95 will now be appreciated. As an edge 96 meets the resistance of the work it retreats and at the same time rises slightly, the opposite edge 96 falling correspondingly from contact with the work. Upon the reversal of the movement the second edge begins to cut and the first falls. The side knives 97 97 cut the sides of the mortise smoothly. By suitably proportioning the size of the coöperating elements a greater or less number of strokes may be completed by each chisel while the stiles are being drawn toward their lowest position.

We do not limit ourselves to the precise form and arrangement of parts herein shown and described, but retain the right to vary the same within the scope of our invention as set forth.

What we claim, and desire to protect by Letters Patent, is—

1. In a mortising-machine, frames having suitable guides, in combination with duplicate slides adapted to be reciprocated within corresponding guides in said frames, rods constructed to connect said slides, bell-crank lever-clamps pivotally borne by said rods, means for balancing the weight of said slides, rods and clamps, adjustable clamping devices coöperating with corresponding guides in said frames, and mechanism for actuating said slides and said adjustable clamping devices, substantially as described.

2. In a mortising-machine, frames having outer and inner guide-grooves, in combination with duplicate slides adapted to be reciprocated within said outer guide-grooves, each of said slides having arms extending from its upper portion and a middle longitudinal slot, each of said slides provided near its lower end with a lug and a projecting arm, rods constructed to connect the upper arms of opposite slides above the frames, bell-crank lever-clamps pivotally borne by said rods, braces constructed to connect said rods, each brace possessing a pin arranged between the arms of said bell-crank clamps to limit the movement thereof, levers having suitable fulcrums, said levers arranged in contact with the lugs upon said slides, weights adjustably connected with the levers, adjustable clamping devices coöperating with said inner guide-grooves, and means for actuating said slides and adjustable clamping devices, substantially as described.

3. In a mortising-machine, frames having suitable guides, in combination with slides adapted to be reciprocated within corresponding guides in said frames, parallel beams, attachments borne by said slides and constructed to support the beams, projections fixed upon said frames to limit the upward movement of the slides, means for adjusting said attachments thereby increasing or decreasing the interval between said beams, levers having fulcrums upon said frames and arranged in contact with said slides, weights adjustably connected with said levers, adjustable clamping devices coöperating with corresponding guides in said frames, and mechanism for actuating said adjustable clamping devices and said slides, substantially as described.

4. In a mortising-machine, frames having outer and inner guide-grooves, in combination with slides adapted to be reciprocated within said inner guide-grooves, parallel beams having attached to their lower edges adjustable, stile-supporting stops, frames attached to said slides and provided with orifices through opposite sides, plates having portions possessing threaded orifices and adapted to be reciprocated within said frames and portions connected with and supporting said beams, adjusting-screws passing through the orifices in said frames and engaging the threaded orifices in said beam-supporting plates whereby the interval between the beams may be varied, levers having fulcrums upon said grooved frames and arranged in contact with said slides, weights adjustably connected with said levers, adjustable clamping devices coöperating with said outer guide-grooves, and mechanism for actuating said adjustable clamping devices and said slides, substantially as described.

5. In a mortising-machine, frames each having guide-grooves upon both sides, said grooves being longer upon the exterior than upon the inner sides, in combination with slides adapted to be reciprocated within the longer of said guide-grooves, rods constructed to connect said slides, bell-crank lever-clamps pivotally borne by said rods, means for balancing the weight of said slides, rods, and clamps, mechanism for operating said slides, inner slides adapted to be reciprocated within the shorter guide-grooves of said frames, parallel beams having adjustable stile-supporting stops, attachments borne by said inner slides and constructed to support the beams, means for adjusting said attachments thereby increasing or decreasing the interval between said beams, levers having fulcrums upon said grooved frames and arranged in contact with said inner slides, and weights adjustably connected with said levers, substantially as described.

6. In a mortising-machine, frames having suitable orifices, in combination with a stay-beam fixed to said frames, said stay-beam having an upper surface grooved longitudinally, a block having ridges or beads upon its lower surface engaging the grooves of said stay-beam, a rod constructed to be moved lengthwise within orifices in said frames, said block having a central orifice fitting said rod, means for adjusting and fixing said block upon the rod, chisels having edges adapted to cut horizontally when actuated, attachments borne by said block for pivotally fixing said chisels upon the sides of said block and for limiting the vibratory movement of the chisels, and mechanism for reciprocating said rod, substantially as described.

7. In a mortising-machine, a rod provided with a succession of recesses, in combination with a block having a central orifice, said block having an exteriorly-threaded hollow projection, a collar possessing a radial orifice having a threaded portion, said collar having a cylindrical hollow projection threaded exteriorly, a screw-plug, a spiral spring, a pin adapted to enter the recesses of said rod, a nut constructed to engage the exteriorly-threaded projections of said collar and block, chisels designed to be actuated laterally and having edges adapted to cut horizontally, attachments borne by said block for pivotally fixing said chisels upon the sides of said block and for limiting the vibratory movement of the chisels, substantially as described.

8. In a mortising-machine, frames having suitable orifices, in combination with a revoluble shaft journaled in said frames, eccentrics attached to said shaft, eccentric-rods, rods having extremities fixed in orifices in said frames, the said eccentrics and eccentric-rods being adjustable along said shaft, guide-plates having guide-grooves and detachably connected with said rods, chisel-sockets adapted to be reciprocated within the guide-grooves of said plates, cross-heads pivotally connected with said eccentric-rods and attached to said chisel-sockets, means for retaining said sockets within the guide-grooves of said plates, said plates, sockets and cross-heads being adjustable along said fixed rods in correspondence with the adjustment of said eccentrics and eccentric-rods, substantially as described.

9. In a mortising-machine, frames having suitable orifices, in combination with a stay-beam fixed to said frames, said stay-beam having an upper surface grooved longitudinally, a block having ridges or beads upon its lower surface engaging the grooves of said stay-beam, a rod constructed to be moved lengthwise within orifices in said frames, said block having a central orifice fitting said rod, means for adjusting and fixing said block upon said movable rod, chisels having edges adapted to cut horizontally when actuated, attachments borne by said block for pivotally fixing said chisels upon the sides of said block and for limiting the vibratory movement of the chisels, a crank-plate having a plurality of orifices, a pitman-rod having a pin at one end adapted to fit the orifices in said crank-plate, said pitman-rod pivotally connected with said movable rod, mechanism for operating said crank-plate, a revoluble shaft journaled in said frames, eccentrics attached to said shaft, eccentric-rods, rods having extremities fixed in orifices in said frames, guide-plates having guide-grooves and detachably connected with said rods, chisel-sockets adapted to be reciprocated within the guide-grooves of said plates, cross-heads pivotally connected with said eccentric-rods and attached to said chisel-sockets, means for retaining said sockets within the guide-grooves in said plates, and braces constructed to connect said fixed rods, substantially as described.

10. In a mortising-machine, frames having outer and inner guide-grooves and suitable orifices, adjustable clamping mechanism coöperating with said outer and inner guide-grooves, means for reciprocating said clamping mechanism, in combination with a stay-beam fixed to said frames, said stay-beam having an upper surface grooved longitudinally, a block having ridges or beads upon its lower surface engaging the grooves of said stay-beam, a rod constructed to be moved lengthwise within orifices in said frames, said block having a central orifice fitting said rod, means for adjusting and fixing said block upon said movable rod, chisels having edges adapted to cut horizontally when actuated, attachments borne by said block for pivotally fixing said chisels upon the sides of said block and for limiting the vibratory movement of the chisels, a crank-plate having a plurality of orifices, a pitman-rod having a pin at one end adapted to fit the orifices in said crank-plate, said pitman-rod pivotally connected with said movable rod, mechanism for operating said crank-plate, a revoluble shaft journaled in said frames, eccentrics attached to said shaft, eccentric-rods, rods having extremities fixed in orifices in said frames, guide-plates having guide-grooves and detachably connected with said rods, chisel-sockets adapted to be reciprocated within the guide-grooves of said plates, cross-heads pivotally connected with said eccentric-rods and attached to said chisel-sockets, means for retaining said sockets within the guide-grooves in said plates, and braces constructed to connect said fixed rods, substantially as described.

11. In a mortising-machine, the combination of frames having suitable guides and orifices, adjustable clamping devices reciprocative within said guides, weight-operated levers arranged to lift said clamping devices, mechanism adapted to lower said clamping devices, a rod or bar movable lengthwise in said orifices, chisels adapted to cut horizontally when moved laterally, longitudinally-adjustable devices connecting said chisels pivotally with said rod and attachments for limiting the vibrations of the chisels, rods having ends fixed to said frames, guide-plates detachably fixed upon said rods, chisel-sockets reciprocative within said guide-plates, a shaft journaled in said frame, mechanism driven by said shaft for reciprocating said movable rod, and devices adjustable longitudinally upon the shaft for reciprocating said sockets, substantially as described.

In testimony whereof we affix our signatures in presence of two witnesses.

WILLIAM H. BOYLE.
THOMAS S. HOMANS.

Witnesses:
   LAWRENCE W. CHURCHILL,
   GEORGE W. REDFIELD.